United States Patent [19]

Ulschmid et al.

[11] Patent Number: 5,813,494
[45] Date of Patent: Sep. 29, 1998

[54] ACCESS LADDER ASSEMBLY FOR AN OFF-HIGHWAY MACHINE

[75] Inventors: Timothy G. Ulschmid, Racine; Richard A. Hardesty, Franksville, both of Wis.; Herb Max Farley, Colona, Ill.

[73] Assignee: Case Corporation, Racine, Wis.

[21] Appl. No.: 389,328

[22] Filed: Feb. 16, 1995

[51] Int. Cl.[6] .................................................. E06C 5/04
[52] U.S. Cl. ........................... 182/97; 182/106; 182/127
[58] Field of Search ............................... 182/97, 98, 127, 182/106

[56] References Cited

U.S. PATENT DOCUMENTS

| | | | |
|---|---|---|---|
| 2,967,584 | 1/1961 | Westerlund | 182/97 |
| 2,999,556 | 9/1961 | Horne et al. | 180/89 |
| 3,083,785 | 4/1963 | Hyman | 182/89 |
| 3,190,392 | 6/1965 | Ashton et al. | 182/97 |
| 3,232,376 | 2/1966 | Lucas et al. | 182/97 |
| 3,508,627 | 4/1970 | Lypko et al. | 182/97 |
| 3,656,578 | 4/1972 | Hemken | 182/97 |
| 3,997,183 | 12/1976 | Russey | 182/97 |
| 4,131,293 | 12/1978 | Kindle | 280/166 |
| 4,153,138 | 5/1979 | Walberg | 182/98 |
| 4,245,716 | 1/1981 | Rayfield | 182/98 |
| 5,117,940 | 6/1992 | Garelick | 182/97 |

FOREIGN PATENT DOCUMENTS

| | | | |
|---|---|---|---|
| 0831945 | 5/1981 | U.S.S.R. | 182/127 |

*Primary Examiner*—Michael J. Carone
*Assistant Examiner*—Joanne C. Downs
*Attorney, Agent, or Firm*—Mayer, Brown & Platt

[57] ABSTRACT

An access ladder assembly for an agricultural machine having a body with an elevated operator's station. The ladder assembly includes a ladder that is mounted to the frame of the machine by a pivot mechanism that allows the ladder to be moved in either rotational direction about both a generally horizontal axis and a generally vertical axis. A locking mechanism releasably holds the ladder in an angularly adjusted position about both of these axes. A release mechanism conveniently located relative to the operator's station controls operation of the locking mechanism. The ladder assembly further includes rail structure carried by the ladder and movable about a generally vertical axis to either of two adjusted positions.

21 Claims, 9 Drawing Sheets

ACCESS LADDER ASSEMBLY FOR AN OFF-HIGHWAY MACHINE

FIELD OF THE INVENTION

The present invention generally relates to off-highway machines such as agricultural combines and the like having an elevated operator's station and, more particularly, to a ladder assembly including a ladder for permitting access to the operator station and which allows the ladder to be moved about both generally vertical and generally horizontal axes.

BACKGROUND OF THE INVENTION

Off-highway machines such as agricultural combines and cotton harvesters include a housing or body that is supported for movement across a field on a mobile frame. Relatively large front wheels project laterally from the body. An elevated operator's station is typically provided at the forward end of the machine. The heightened elevation of the operator's station provides the operator a good view of the operating instrumentalities arranged at the forward end of the machine. To gain access to the operator's station on some off-highway machines, the operator must climb over wheels that support the frame.

Typically, a generally horizontal platform is provided outside of the operator's station. A guard rail extends at least partially about the platform and is provided with an access opening. It is known, of course, to provide a ladder or other mounting structure to facilitate access to and dismounting from the platform. From the platform, ready access is provided to and from the operator's station.

Access ladders, although convenient, present a number of problems to the efficient operation of the off-highway machine. As is well known, off-highway machines frequently travel over muddy fields and/or over terrain that is irregular or bumpy. In muddy fields, the machine occasionally sinks into the mud to an extent causing the lower end of the ladder to often times engage the ground thereby breaking or severely damaging the ladder. Similarly, the lower end of the ladder may encounter uneven terrain as the machine moves thereover thus resulting in damage to the ladder and possibly to the machine. For these reasons, others have proposed to mount the ladder for pivotal movement between a generally vertical position, whereat the lower end of the ladder is accessible, and a raised position, whereat the lower end of the ladder is elevationally raised to prevent its engagement with the ground as the machine moves thereover. Furthermore, a depending ladder creates an obstacle during field operations. When arranged on an agricultural machine, and when disposed in an operational position, the ladder extends laterally outwardly of the machine and may be engaged by standing crop rows and either damage itself by the impact or cause damage to the standing crop rows.

As mentioned, when the ladder is in a vertical operating position, the ladder protrudes beyond the outside of the wheel. Thus, the ladder increases the overall width of the machine and hinders transport across highways. Moreover, European standards require the width of the machine to be minimized during transportation of the machine. Of course, any protrusion beyond the width of the wheels increases the possibility of adverse contact with buildings, gates, other vehicles and similar obstacles commonly found in the area in which the machine operates.

Some machine manufacturers require the ladder to be disassembled and shipped loosely from the machine. Shipping the ladder loosely from the machine increases the risks of accidents during shipping and unloading of the machine. Alternatively, some manufacturers allow the ladder to be moved forwardly of the wheels for narrow road transport. No one mechanism, however, is provided for permitting both vertical displacement of the ladder plus movement of the ladder from a side to the front of the platform.

Thus, there is a need and a desire for a single mechanism that connects the ladder to the machine and allows the ladder to move both vertically, thereby raising the lower end of the ladder from ground engagement, and to a storage position, forwardly of the wheels to narrow the width of the machine thereby enhancing transportation of the machine.

SUMMARY OF THE INVENTION

In view of the above, and in accordance with the present invention, there is provided an access ladder assembly for an off-highway machine. The machine has a housing or a body with an elevated operator station preferably arranged toward a forward end thereof. The ladder assembly includes a ladder having a plurality of vertically spaced steps for permitting access to the operator station and that is affixed to a frame of the machine by a pivot mechanism that allows for movement of the ladder in either rotational direction about both a generally horizontal axis and a generally vertical axis.

The pivot mechanism preferably includes an angled pivot member that rotatably mounts to the frame of the machine and defines the pivot axes for the ladder. The pivot mechanism is connected to an upper end of the ladder. When arranged in combination with an agricultural machine, the pivot mechanism permits shifting movements of the ladder between an operative position, in which the ladder extends downwardly from the operator station on the opposite side of the wheel from the operator station, to a storage position, in which the ladder is disposed generally transverse to the direction of movement of the wheel. The pivot mechanism further allows the lower end of the ladder to pivot upwardly from its normal vertical position to a transport position thereby enhancing the ground clearance between the lower end of the ladder and the terrain over which the machine moves.

The ladder assembly of the present invention further includes a locking mechanism for selectively holding the ladder in an adjusted angular disposition relative to the operator station. The locking mechanism preferably includes a release mechanism, conveniently located relative to the operator station, for releasing the locking mechanism thereby allowing the angular disposition of the ladder relative to the operator station to be adjusted about either the first or second axes.

In a preferred form of the invention, the locking mechanism comprises a first detent mechanism for releasably holding the ladder in a selected vertical position and a second detent mechanism for releasably holding the ladder against movement between the side of the machine and a front side of the operator station. In a most preferred form of the invention, the second detent mechanism furthermore allows the free end of the ladder to be shifted transversely inwardly toward and releasably held relative to the frame once the ladder is moved from its normal upright position. As will be appreciated, the ability to move the raised and free end of the ladder inwardly relative to the frame inhibits damage from and to adjacent rows of crop materials as the machine is driven across the field. To inhibit inadvertent damage to the ladder, the locking mechanism further includes a shear pin for holding the ladder against unintentional pivotal movement about the horizontal axis relative to the operator's station and yet allows the ladder to pivot about the horizontal axis when a force of given magnitude is applied to the ladder whereby shearing the pin.

A typical agricultural machine conventionally includes a generally horizontal platform that extends laterally from one side of the operator's station. The platform has an access side and a guard rail that extends partially about the platform with an access opening being provided in the guard rail on the access side of the platform. The ladder assembly of the present invention further includes rail structure that projects upwardly beyond the upper end of the ladder. The rail structure is mounted to the ladder for swinging movement about a generally vertical axis and relative to the ladder such that when the ladder is in its vertical operating position, the rail structure permits ingress and egress through the access opening in the guard rail extending about the platform. On the other hand, when the ladder is swung to a forward side of the platform, the rail structure on the ladder may be rotated relative to the ladder and positioned such that it hinders ingress and egress through the access opening in the guard rail.

The ability to move a normally vertically disposed ladder relative to the operator's station of an off-highway machine and about either a generally vertical axis or a generally horizontal axis allows a lower end of the ladder to be positioned to prevent ground engagement or allows the entire ladder to be swung to a position thereby reducing the overall width of the machine. The releasable locking mechanism, preferably including a foot operated release that is conveniently located relative to the operator station, advantageously allows the disposition of the ladder to be selectively set into any of several different angular positions about either axis of movement. Moreover, the adjustable rail structure extending from the upper end of the ladder furthermore inhibits egress from the platform when the ladder is disposed in a storage position. Beneficially, the ladder of the present invention is of relatively simple construction and is relatively inexpensive to manufacture.

These and other objects, aims and advantages of the present invention will become readily apparent from the following detailed description of the invention, the claims, and the accompanying drawings.

DETAILED DESCRIPTION OF THE DRAWINGS

DETAILED DESCRIPTION OF THE PRESENT INVENTION

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Figure 1:
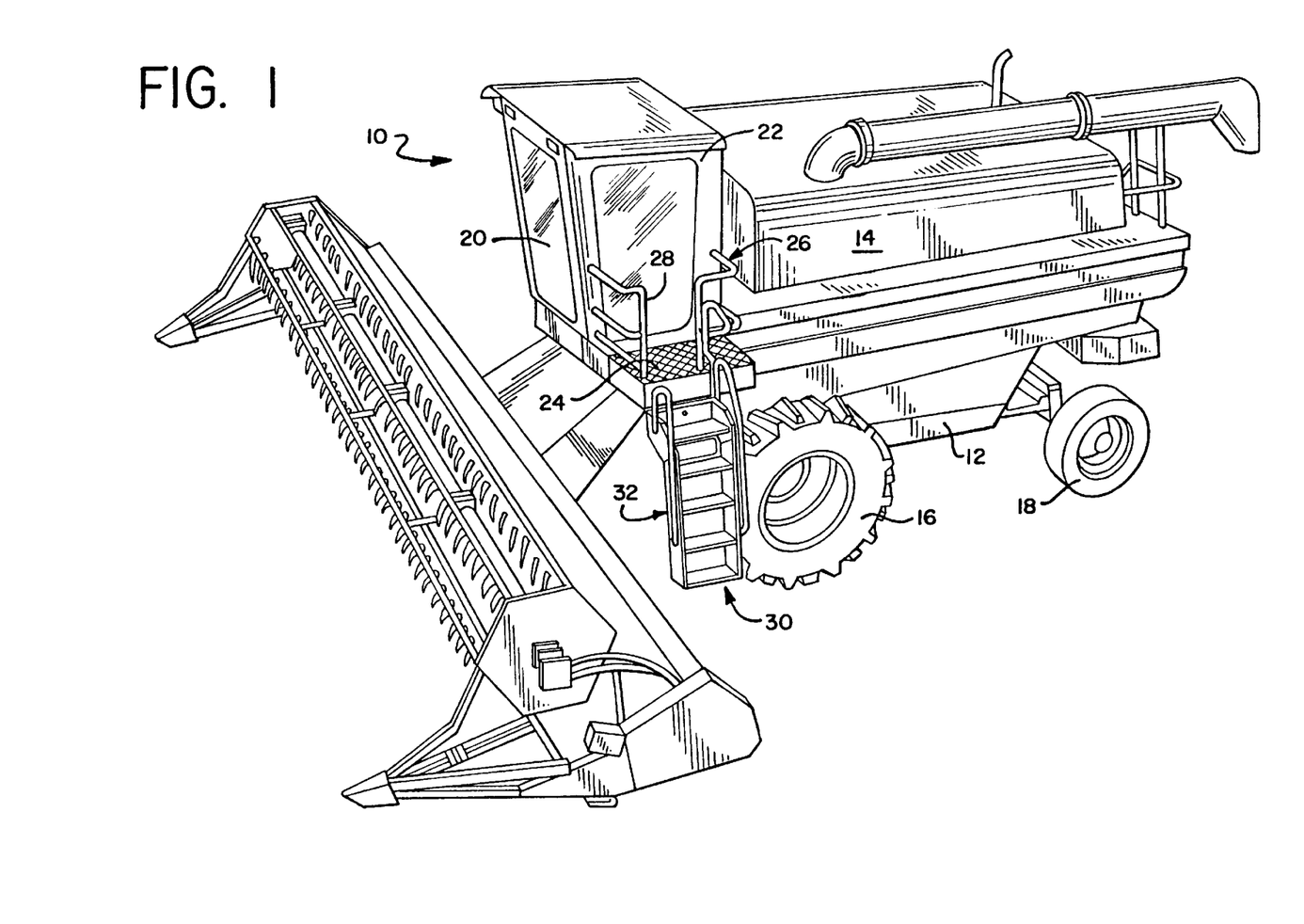
FIG. 1 is a perspective view of an agricultural machine embodying the ladder assembly of the present invention.
Figure 2:
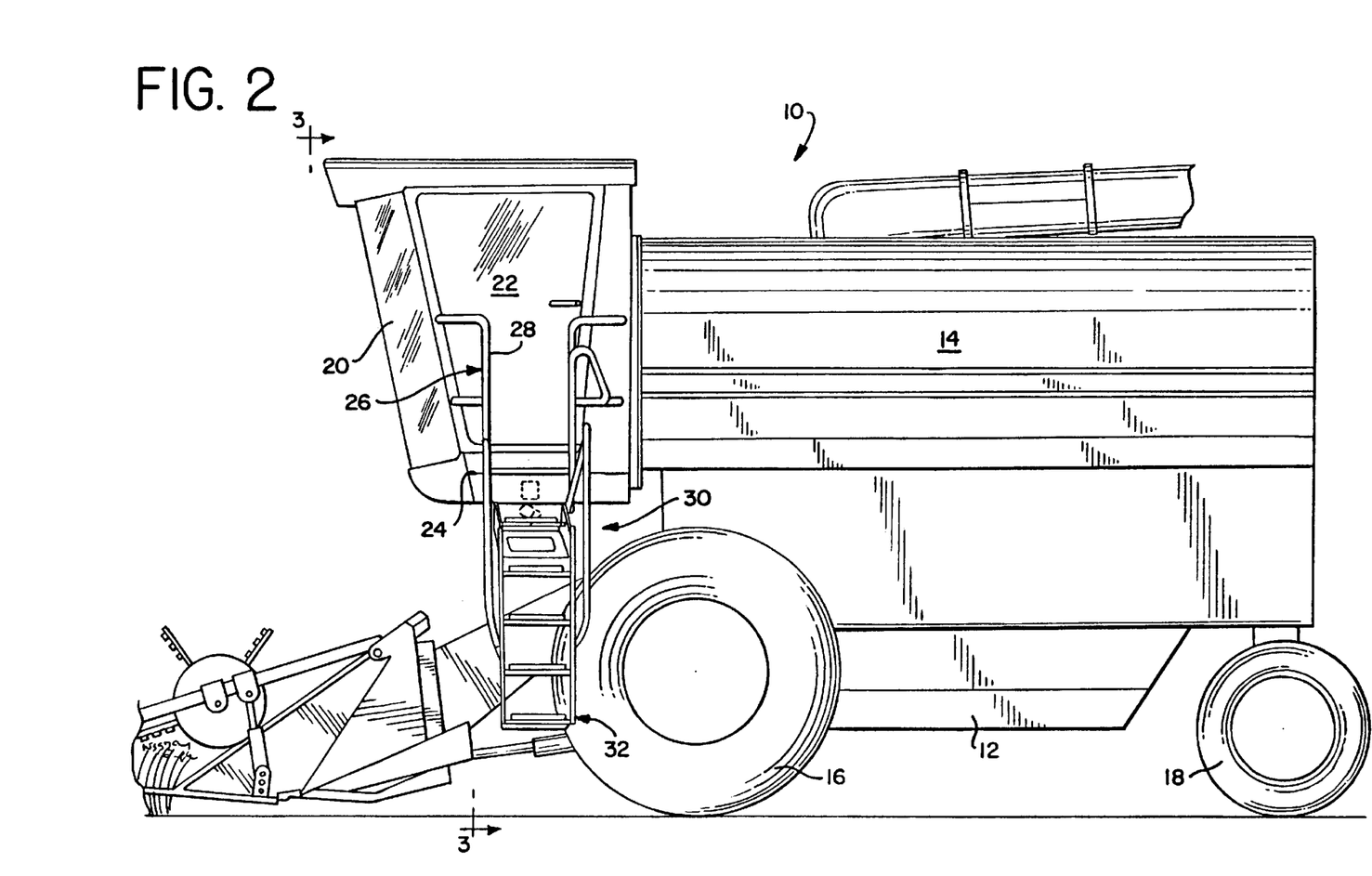
FIG. 2 is a side elevational view of the agricultural machine shown in FIG. 1.

Referring now to the drawings wherein like reference numerals refer to like parts throughout the several views, FIGS. 1 and 2 schematically illustrate an off-highway machine such as a self-propelled rotary combine of the type sold by Case Corporation of Racine, Wis. under model number 2100. It should be appreciated, however, that the present invention is not limited to the machine shown in the drawings but is equally applicable to other types of off-highway machines having elevated operator's station.

As shown, the machine 10 includes a fore-and-aft extending frame 12 having a body or housing 14 supported thereon. In the illustrated embodiment of the machine, a pair of relatively large traction wheels 16 is arranged toward a front end of the frame 12 while a pair of smaller and steerable wheels 18 is arranged toward a rear end of the frame 12. Both pairs of wheels 16 and 18 project laterally from opposite sides of the body 12. Machine 10 is further provided with an operator's station or cab region 20 located at the front of the body 14 above the level of the drive wheels 16. It will be appreciated that because of the elevated and forward position of the operator's station 20, the operator is provided with an unobstructed view down and forward of the machine. As is typical, the operator's station 20 is preferably configured as an enclosure having a door 22 for providing ingress and egress access from the enclosure.

Figure 3:
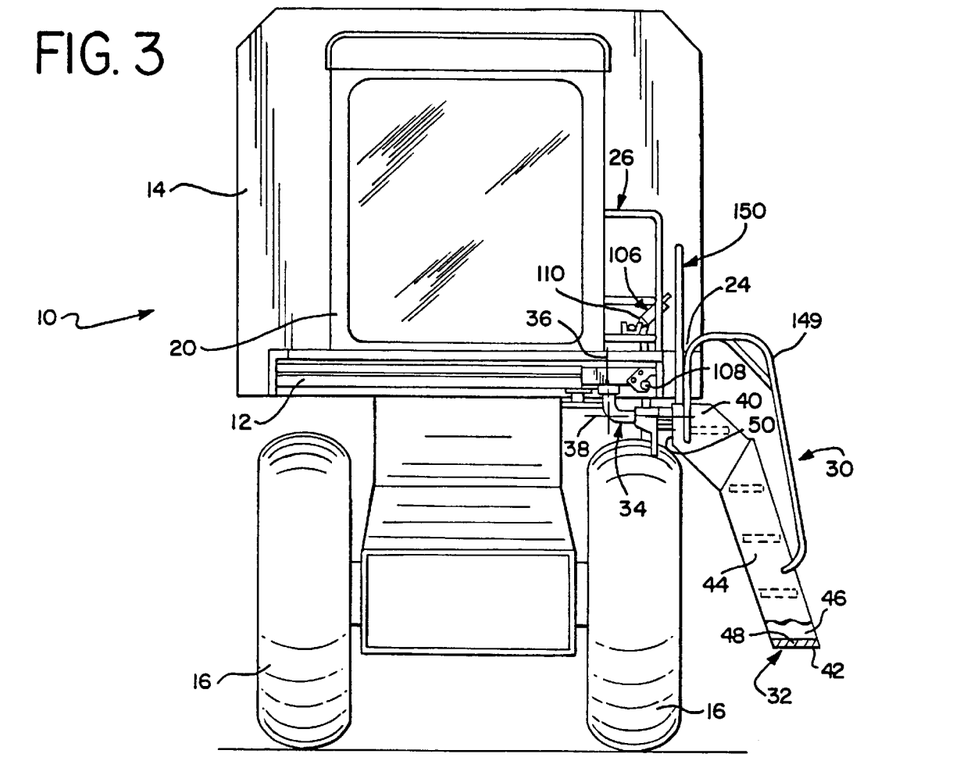
FIG. 3 is a partial front elevational view of the agricultural machine taken along line 3—3 of FIG. 2.

As shown in FIGS. 1, 2 and 3, and as is conventional, the machine 10 is further provided with a generally horizontal and elevated platform or deck 24 that is supported on an underside by the frame 12 of the machine. The platform or deck 24 extends laterally outwardly in overlying relation to the drive wheels 16 and from that side of the operator's station 20 whereat the door 22 is located. The platform 24 has an access side and is partially surrounded by a guard rail 26. The guard rail 26 is provided with an access opening 28 on the access side of the platform 24.

In accordance with the present invention, access to the platform 24 and thence to the operator's station 20 is provided through a ladder assembly 30. The ladder assembly 30 of the present invention includes an elongated ladder 32 that affords access to the platform or deck 24 and is connected to the frame 12 of the machine 10 by a pivot mechanism 34. Pivot mechanism 34 allows for pivotal movement of the ladder in either rotational direction about both a generally vertical axis 36 and a generally horizontal axis 38.

Figure 4:
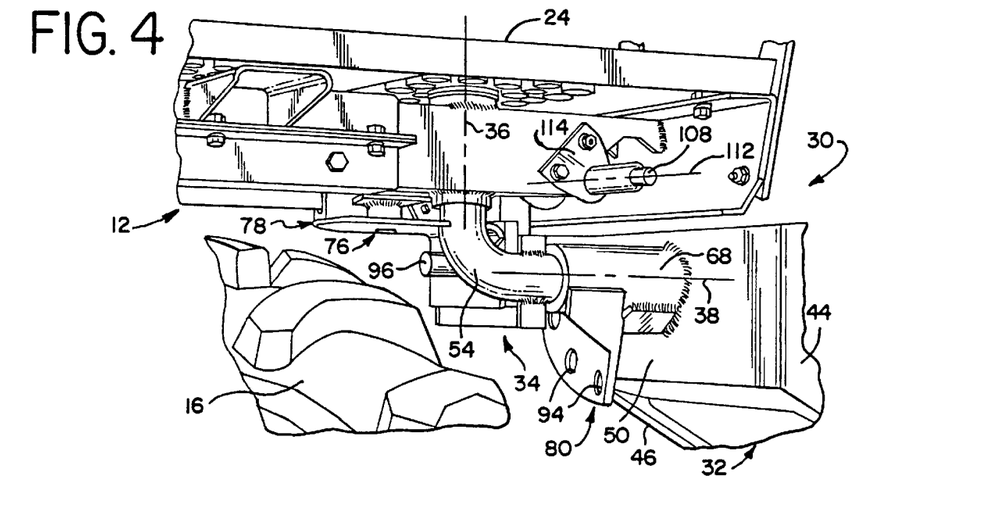
FIG. 4 is a perspective view of a part of the present invention.

The ladder 32, which can best be seen in its entirety in FIG. 3, has an upper end 40 disposed vertically proximate to the deck 24 and a lower end 42 disposed closer to the ground. As shown in FIGS. 3 and 4, ladder 32 includes a pair of generally parallel side frame members 44 and 46 with a plurality of vertically spaced steps or rungs 48 connected there between. Ladder 32 further includes a vertically disposed top member or plate 50 that preferably extends between and is rigidly connected to the side frame members 44 and 46 of ladder 32.

Figure 5:
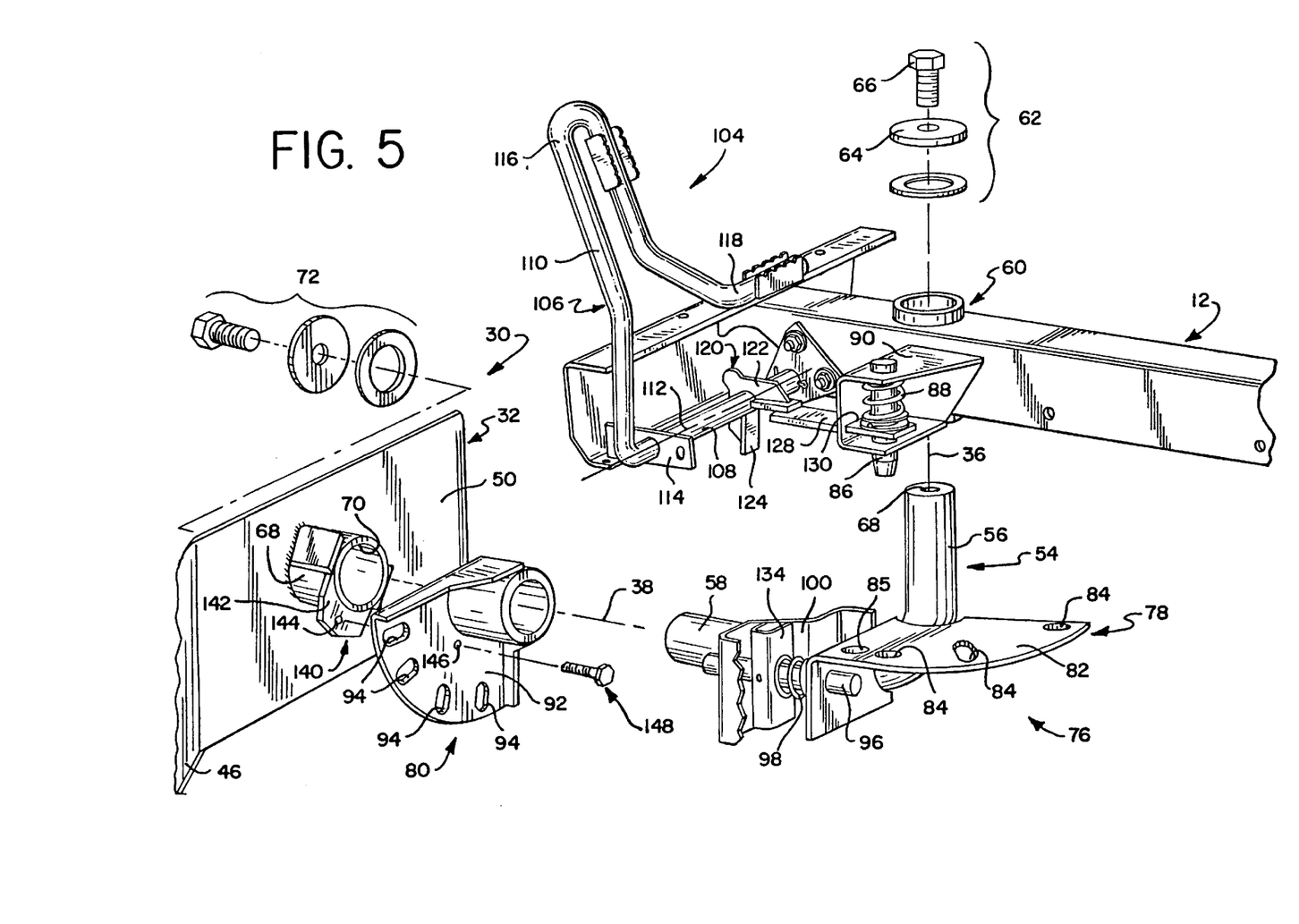
FIG. 5 is a simplified exploded perspective view of part of the present invention with parts broken away to illustrate details thereof.

As shown in FIGS. 4 and 5, the pivot mechanism 34 preferably includes a one-piece angled pivot member 54 that is rotatably mounted to the frame 12 of the machine 10 and defines the axes 36 and 38 about which the ladder 32 moves. As shown in FIG. 5, the pivot member 54 includes a first arm 56 that defines the generally vertical axis 36 and that is preferably integrally joined to a second arm 58 which defines the second generally horizontal axis 38. As shown, arm 56 of pivot member 54 is journalled for rotation in a bearing or bushing 60 affixed to that portion of the frame 12 which underlies the deck or platform 24 (FIG. 3). A fastener assembly 62 pivotally secures member 54 to frame 12 for rotation in either direction about axis 36. The fastener assembly 62 preferably includes a thrust washer 64 that rides or rotates about the upper surface of bearing 60 and a threaded fastener 66 that passes through washer 64 and is threadably received in a threaded bore 68 provided at the free end of arm 56 of pivot member 54.

As illustrated in FIG. 5, ladder 32 is mounted on the other arm 58 of pivot member 54 for rotation in either direction about the generally horizontal axis 38. In the illustrated embodiment, a preferably cylindrical sleeve 68 is affixed, as by welding or the like, to a rear side of the top member 50 on ladder 32. Sleeve 68 defines a cavity 70 which accommodates the free end of arm 58 of pivot member 54. To facilitate rotation of the ladder 32 about axis 38, a bearing (not shown) may be provided between the sleeve 68 and arm 58 of pivot member 54. The ladder 32 is secured to arm 58 of pivot member 54 as by a fastener assembly 72. In the illustrated embodiment, fastener assembly 72 is substantially similar to fastener assembly 62 discussed in detail above.

Figure 6:
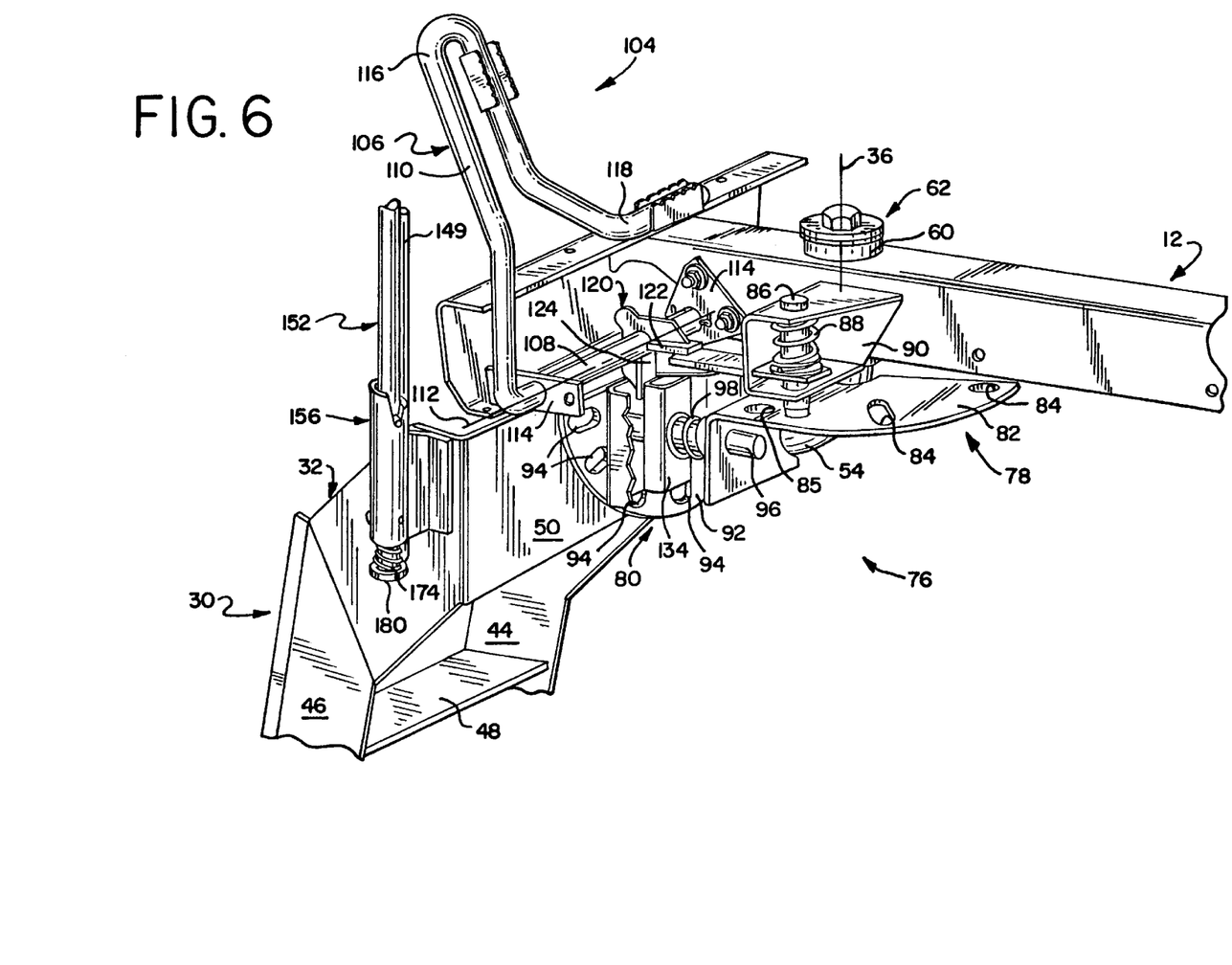
FIG. 6 is an assembled perspective view of the present invention.

A locking mechanism 76 is provided in combination with the ladder assembly 30 for releasably holding the ladder 32 in an adjusted angular position relative to the operator's station 20 (FIG. 1) and about the first and second axes 36 and 38, respectively. As shown in FIGS. 5 and 6, the locking mechanism 76 comprises a detent mechanism 78 for releasably holding the ladder 32 against movement about axis 36 and a second detent mechanism 80 for releasably holding the ladder 32 against movement about axis 38.

Figure 8:
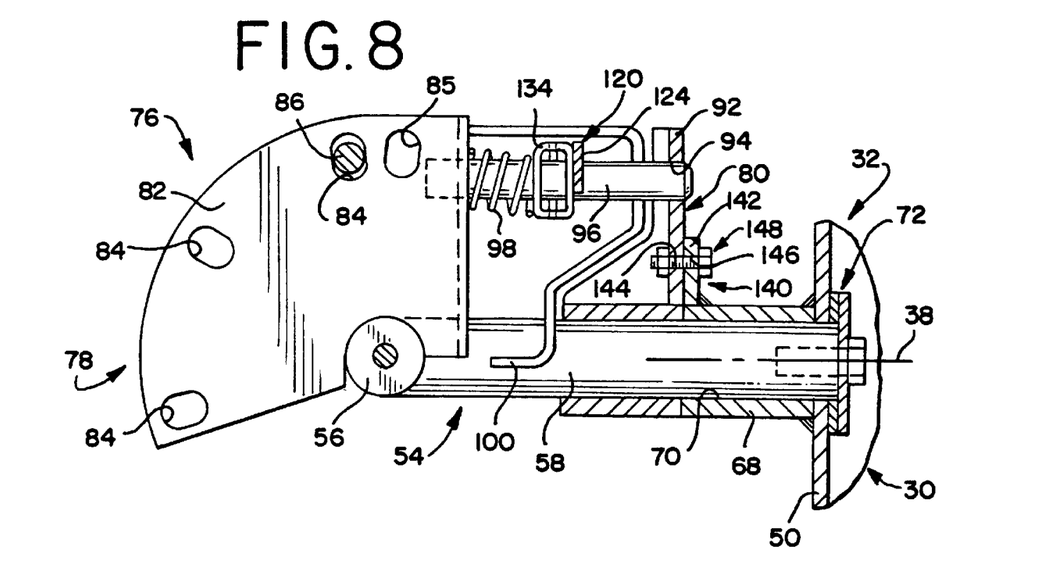
FIG. 8 is a top plan view partially in section of a mounting structure for the present invention.

In a preferred form of the invention, detent mechanism 78 comprises a follower 82 that turns in response to rotational movement of the ladder 32 about the generally vertical axis 36. As shown in FIGS. 5 and 6, follower 82 is configured as a generally horizontal plate that radially extends outwardly and away from the upper pivot leg 56 and turns with pivot member 54. Follower 82 is provided with a series of apertures or holes 84 defined a common radial distance from the axis 36 and disposed at different angular positions about the plate 82. Follower 82 is further provided with a hole or aperture 85 defined a common radial distance from the axis 36 as are holes 84 for purposes to be described in detail hereinafter. As shown in FIG. 8, the hole or aperture 85 is transversely disposed forwardly of a vertical plane passing parallel to and through axis 36 and normal to axis 38.

Detent mechanism 78 further includes a locking pin 86 that is movable along a path of travel extending generally normal to the follower 82 and is resiliently biased toward engagement with the follower 82. A spring 88 is preferably used to bias pin 86 toward the following 82 and, ultimately, into locking engagement with one of the holes 84, 85 defined in the follower 82 thereby firmly locking the ladder 32 in an adjusted angular position about axis 36. The spring-biased pin 86 is preferably carried and guided by a bracket 90 that is affixed to the frame 12.

In the illustrated form of the invention, detent mechanism 80 comprises a follower 92 that turns in response to rotation of the ladder 32 about the generally horizontal axis 38. As shown in FIGS. 5 and 6, follower 92 is preferably configured as a generally vertical plate that extends radially outward and away from the pivot leg 58 and turns with pivot member 54. The follower 92 extends generally parallel to the top member 50 of the ladder 32 and is provided with a series of apertures or holes 94 defined a common radial distance from the axis 38 and disposed at different angular positions about the plate 92. Detent mechanism 80 further includes a locking pin 96 that is movable along a path of travel extending generally normal to the follower 92 and is resiliently biased toward engagement with the follower 92 and, ultimately, into locking engagement with one of the holes 94 defined in the follower 92 thereby firmly locking the ladder 32 in an adjusted angular position about axis 38. A spring 98 is preferably used to bias pin 96 into engagement with follower 92. The spring-biased pin 96 is preferably carried and endwise guided by a bracket 100 that moves with the pivot member 54. When the ladder 32 is in a normal position to provide access to the operator station 20, locking pin 86 is normally disposed in the hole 84 as shown in FIGS. 6 and 8.

To promote efficient and effective operation of the detent mechanisms 78 and 80, the locking pins 86, 96 associated with each detent mechanism preferably have a frustoconically shaped configuration at that end of the pin that is adapted to fit into one of the openings 84, 85, 94 defined in the respective followers 82, 92. Moreover, each of the openings or holes 84, 85, 94 in the followers 82, 92, respectively, is elongated in a radial direction relative to a respective pivot axes to promote acceptance of the locking pin thereinto.

The separate detent mechanisms 78 and 80 comprising locking mechanism 76 for the ladder assembly 32 are preferably operated under the influence of a release mechanism 104. The release mechanism 104 preferably includes a single actuator 106 that is conveniently located relative to the operator station 20 for releasing the locking mechanism 76 thereby allowing the angular disposition of the ladder 32 to be adjusted about the axes 36, 38.

Figure 7:
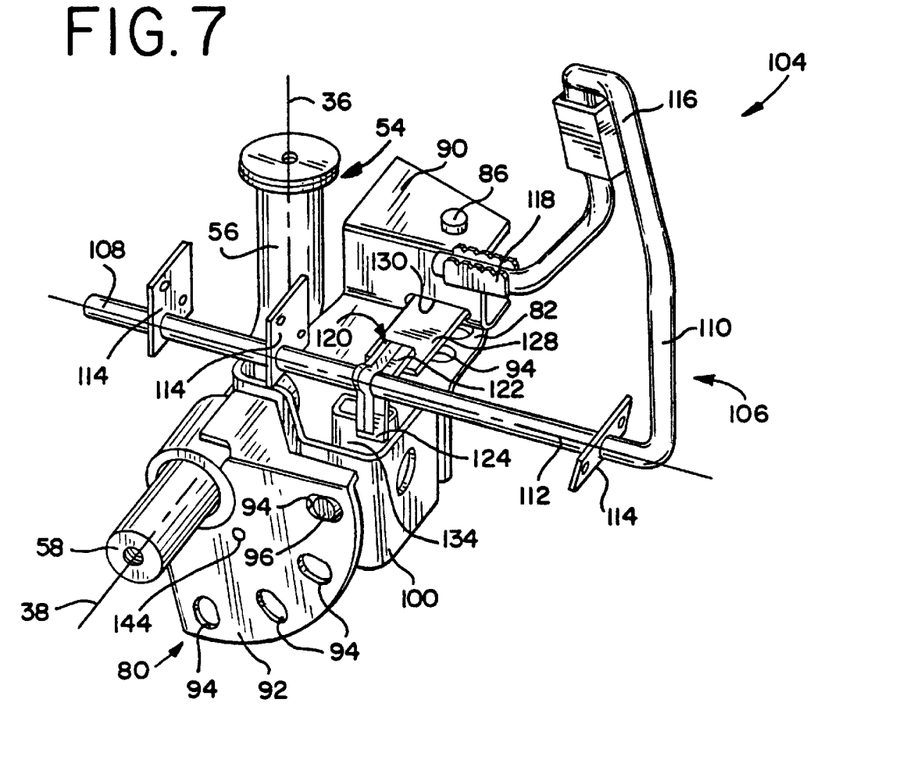
FIG. 7 is a perspective view of the present invention with parts broken away for purposes of simplicity.

As shown in FIGS. 5, 6 and 7, the actuator 106 preferably comprises a pivot bar 108 having a vertically offset portion 110. The pivot bar 108 extends beneath the platform 24 (FIG. 3) and is journalled for rotation in opposite directions about a fixed fore-and-aft extending axis 112. A plurality of suitable brackets 114 connected to the frame 12 and/or platform 24 pivotally support the bar 108 for rotation in either direction about axis 112. Notably, the bar 108 is mounted in a manner preventing endwise movement thereof along the axis 112.

The purpose of the offset portion 110 of actuator 106 is to promote selective rotational movement in opposite directions to bar 108 about axis 112. In the illustrated embodiment, and as shown in FIG. 3, the offset portion 110 of actuator 106 radially extends from bar 108 and vertically projects upwardly from the platform 24 adjacent to the operator station for convenient access by the operator. Returning to FIGS. 5, 6 and 7, the offset portion 110 of actuator 106 has first and second sections 116 and 118. In the illustrated embodiment sections 116, 118 of actuator 106 are joined to each other but it will be appreciated that other designs of actuator 106 would equally suffice to release the locking mechanism 76. Each section 116, 118 is preferably engagable by a foot of the operator for imparting rotation to the bar 108. Notably, section 116 of the offset portion 110 projects laterally to one side of the pivot axis 112 while section 118 of the offset portion 110 projects laterally to an opposite side of the axis 112. Accordingly, when the operator presses against the first section 116 of the offset portion 110, pivot bar 108 rotates in one direction about axis 112. On the other hand, when the operator presses with a foot against the second section 118 of the offset portion 110, the pivot bar 108 rotates in an opposite direction about axis 112.

As illustrated in FIGS. 5, 6 and 7, the actuator 106 of the release mechanism 104 further includes a controller 120 that moves with the pivot bar 108 in response to actuation of the actuator 106 and selectively operates the detent mechanisms 78 and 80 of the locking mechanism 76. As shown, controller 120 includes a pair of arms 122 and 124 that radially extend in the normal relation to each other as well as radially extending from the pivot bar 108. Arm 122 is operably associated with detent mechanism 78 of the locking mechanism 76. On the other hand, arm 124 of controller 120 is operably associated with detent mechanism 80 of the locking mechanism 76.

As shown in FIG. 5, arm 122 of controller 120 is operably connected to the locking pin 86 of detent mechanism 78. Preferably, an elongated rigid leaf 128 slips through a slot 130 defined in bracket 90. One end of leaf 128 is connected to the locking pin 86 while the other end of leaf 128 underlies arm 122 of controller 120. That portion of bracket 90 that underlies leaf 128 acts as a fulcrum for the leaf 128. Spring 88 preferably encircles pin 86 and is entrapped between bracket 90 and leaf 128. Accordingly, spring 88 serves to return the controller 120 and, thus, the actuator 106 to a preset angular position about axis 112.

As shown in FIGS. 6 and 8, arm 124 of controller 120 is operably connected to the locking pin 96 of detent mechanism 80. Preferably, locking pin 96 is provided with a radial extension 134 intermediate the ends thereof. When the locking pin 96 of detent mechanism 80 is engaged with follower 92, arm 124 of controller 120 abuts with the radial extension 134 on pin 96. Spring 98 preferably encircles pin 96 and is entrapped between the extension 134 and bracket 100 thereby maintaining the locking pin 96 in engagement with follower 92. Moreover, spring 98 serves to return the controller 120 and thereby the actuator 106 to a preset position.

In a most preferred of the invention, the ladder assembly 30 is further provided with a shear assembly 140 for allowing deflection of the ladder 32 from its normal vertical operating position when a nonmovable obstacle or the terrain is unexpectedly encountered. As shown in FIG. 5, the assembly 140 preferably includes and apertured flange 142 that is rigidly connected to and extends radially away from sleeve 68. Flange 142 is arranged proximate and parallel to the plate-like follower 92 of detent mechanism 80. As shown in FIG. 8, follower 92 defines a throughhole or aperture 144 that aligns with a throughhole or aperture 146 in flange 142 when the ladder 32 is in a generally vertical position. A shear pin assembly 148 passes through the apertures 144 and 146 and is secured between the follower 92 and flange 144.

The shear pin assembly 148 is constructed to withstand the application of considerable force in a horizontal direction applied to the ladder 32 without effecting any vertical displacement of the ladder 32 from its normal vertical depending position. Should the ladder 32 encounter an obstruction, such as the terrain, a rock and etc. thereby applying a force of given magnitude to the ladder, the pin assembly 148 will shear thereby allowing the ladder 32 to deflect out of the effective line of travel of the obstruction. In a most preferred form of the invention, the force required to be applied to the lower 42 end of the ladder 32 ranges between about 100 to 250 pounds to impart a shearing action to the assembly 148.

Figure 9:
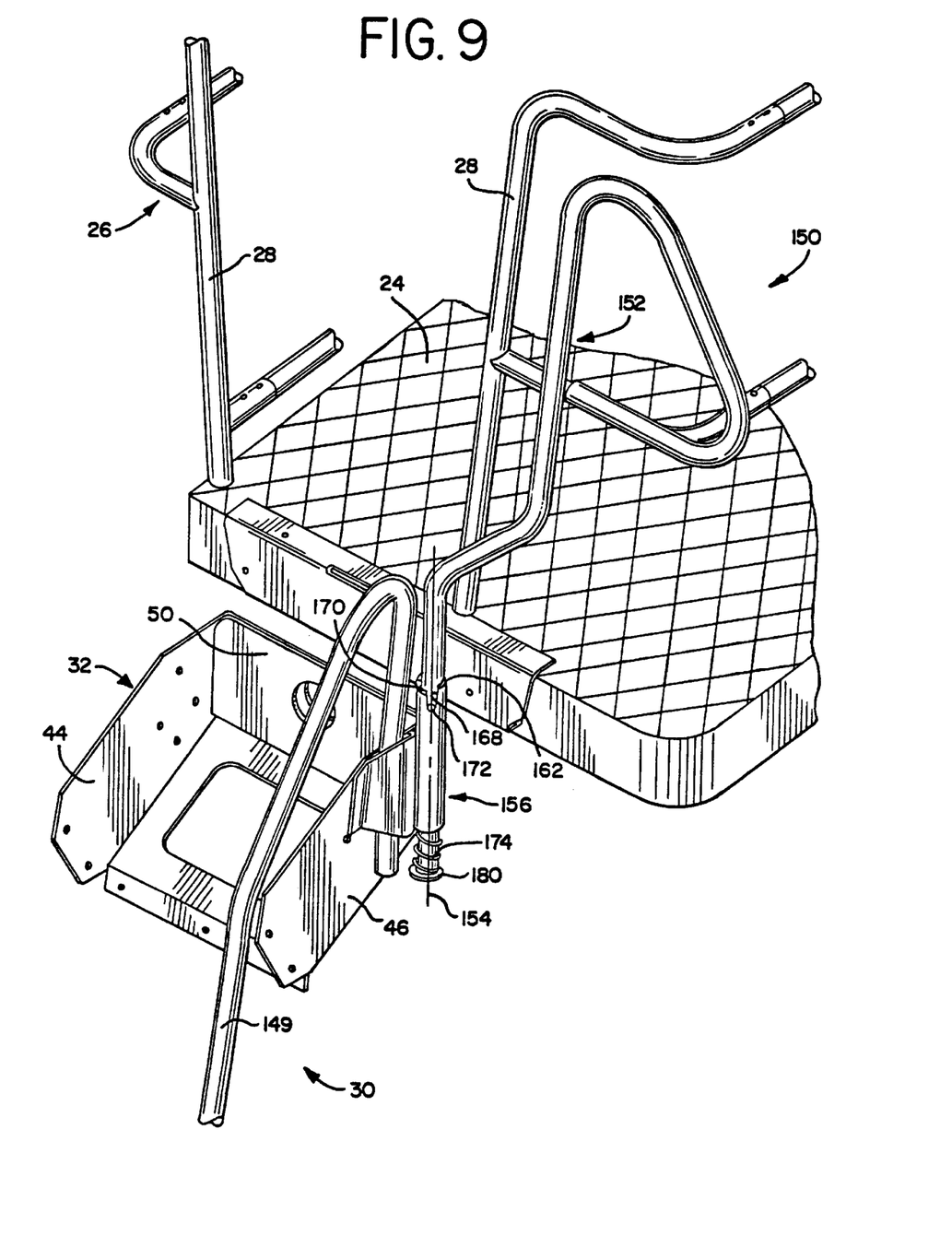
FIG. 9 is a perspective view of an upper end of the ladder assembly with rail structure attached thereto.

In addition to conventional handrail structure 149 typically extending vertically along at least a portion of the lengthwise sides of the ladder 32, the ladder assembly 30 may further include rail structure 150 that hinders ingress and egress through the access opening 28 in the guard rail 26 when the ladder 32 is moved to a storage position in front of the drive wheel 16. As shown in FIG. 9, the rail structure 150 includes an angled preferably tubular rail member 152 that is mounted for movement with the ladder 32 and through a predetermined arc of travel about a generally vertical axis 154.

Figure 10:
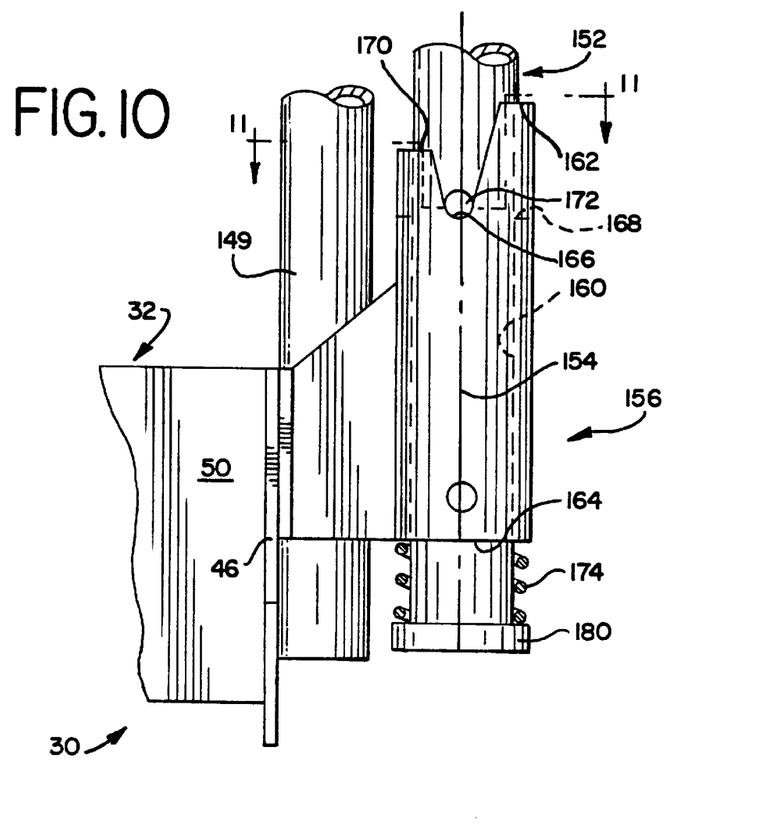
FIG. 10 is an enlarged side elevational view of preferred structure for mounting the rail structure to the ladder.

As shown in FIGS. 9 and 10, a lower end of rail member 152 is telescopically accommodated within a mount 156 preferably secured to the rearmost side frame member 46 of ladder 32 when ladder 32 is in an operational vertical position. A lower, preferably cylindrical portion of rail member 152 projects through and beneath the mount 156. The remainder of the tubular rail member 152 extends beyond and above the mount 156. When the ladder 32 is in a normally vertical or operational position relative to the deck or platform 24, as shown in FIG. 9, the upper portion of the rail structure 150 is configured to extend adjacent to and away from the access opening 28 in the guard rail 26.

With reference to FIG. 10, the mount 156 includes a cylindrical bore 160 defining the axis 154 about which rail member 152 moves and having an inside diameter which is sufficient to rotatably receive and vertically guide the lower end of the rail structure 150. Mount 156 defines a contoured upper end 162 and a bottom end 164.

Figure 11:
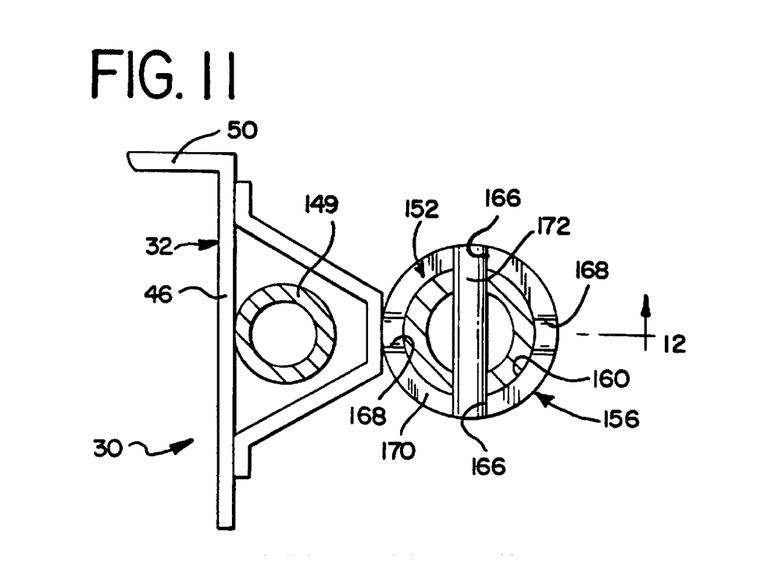
FIG. 11 is a plan view taken along line 11—11 of FIG. 10.

In a preferred form of the invention, the ladder assembly 30 further includes a releasable locking mechanism for releasably holding the rail structure 150 in a selected position relative to the ladder 32. As shown in FIGS. 10 and 11, the locking mechanism for releasably holding the rail structure 150 in position relative to the ladder 32 preferably includes two pairs of downwardly extending notches 166 and 168 preferably provided at the contoured upper end 162 of mount 156. The pairs of notches 166 and 168 are disposed in generally orthogonal relation relative to each other. The notches in each pair of notches 166, 168 are preferably disposed about the periphery of the mount 156 in diametrically opposed relation relative to each other and with a bottom surface preferably being smooth and rounded between adjacent sides of each notch. Notably, a cam surface 170 is provided along the top edge of the mount 156 between the notch 168 closest to the side frame member 46 of ladder 32 and that notch 166 on mount 156 disposed to the outer side of the ladder 32. Moreover, surface 170 extends only a short distance upwardly from the lowermost end of the pair of notches 166 and 168 as compared to the vertical distance between the lower end of the pairs of notches 166 and 168 and the remaining top or upper edge 162 of the mount 156.

A cross pin 172 preferably extends through and radially beyond the outer diameter of the lower end of rail member 152. Pin 172 is readily accommodated in either pair of notches 166 or 168. In addition to the gravitational weight of the rail structure 150, the locking mechanism for the rail structure 150 further includes a spring 174 that is operably associated with and exerts a downward spring bias on the rail structure 150 thereby urging the pin 172 into either pair of notches 166 or 168.

Figure 12:
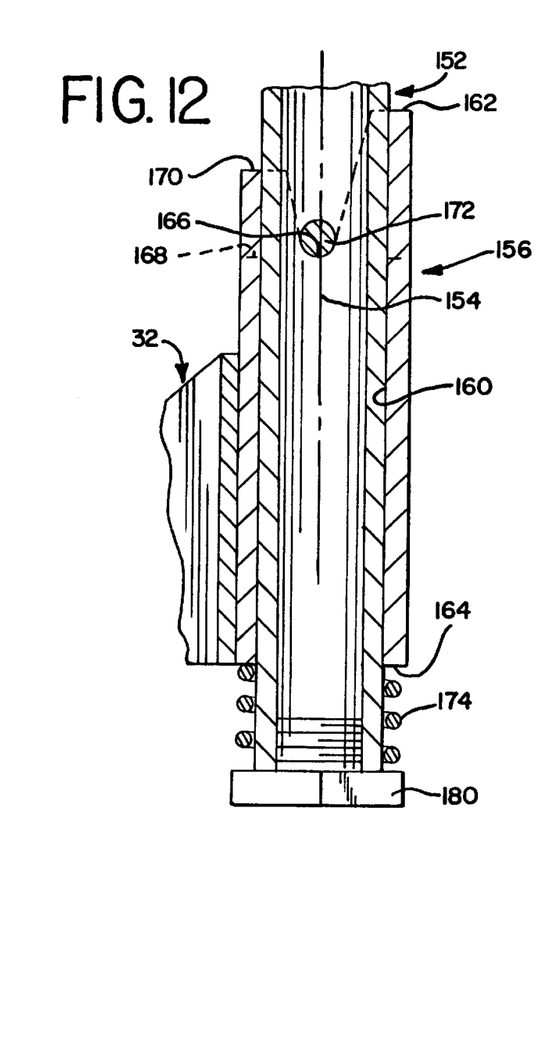
FIG. 12 is a sectional view taken along line 12—12 of FIG. 11.

As seen in FIG. 12, a lower end of rail member 152 is provided with a limit stop 180. Stop 180 may take any suitable configuration that radially projects beyond the periphery of the lower end of rail member 152 to limit vertical displacement of the rail structure 150 when manually displaced about axis 154. In the illustrated form of the invention, spring 174 is in the form of a compression spring that is captively arranged about the lower end of the rail structure 152 between the bottom end 164 of mount 156 and stop member 180. As will be appreciated, upward vertical displacement of the rail structure 150 will result in compression of the spring 174 between mount 156 and stop member 180. Notably, the difference between the completely compressed vertical height of spring 174 and the vertical distance separating the bottom end 164 of mount 156 and an upper operable surface of stop 180 is greater than the vertical distance separating cam surface 170 from the lowermost end of each pair of notches 166, 168 but less than the vertical distance separating the remaining upper edge or end 162 of mount 156 and the lowermost edge of each pair of notches 166, 168. Accordingly, the rail structure 150 is limited to turning movement about vertical axis 154 through an arcuate segment of travel defined by the angular disposition of the pair of notches 166, 168 about the periphery of mount 156 and relative to each other.

Figure 13:
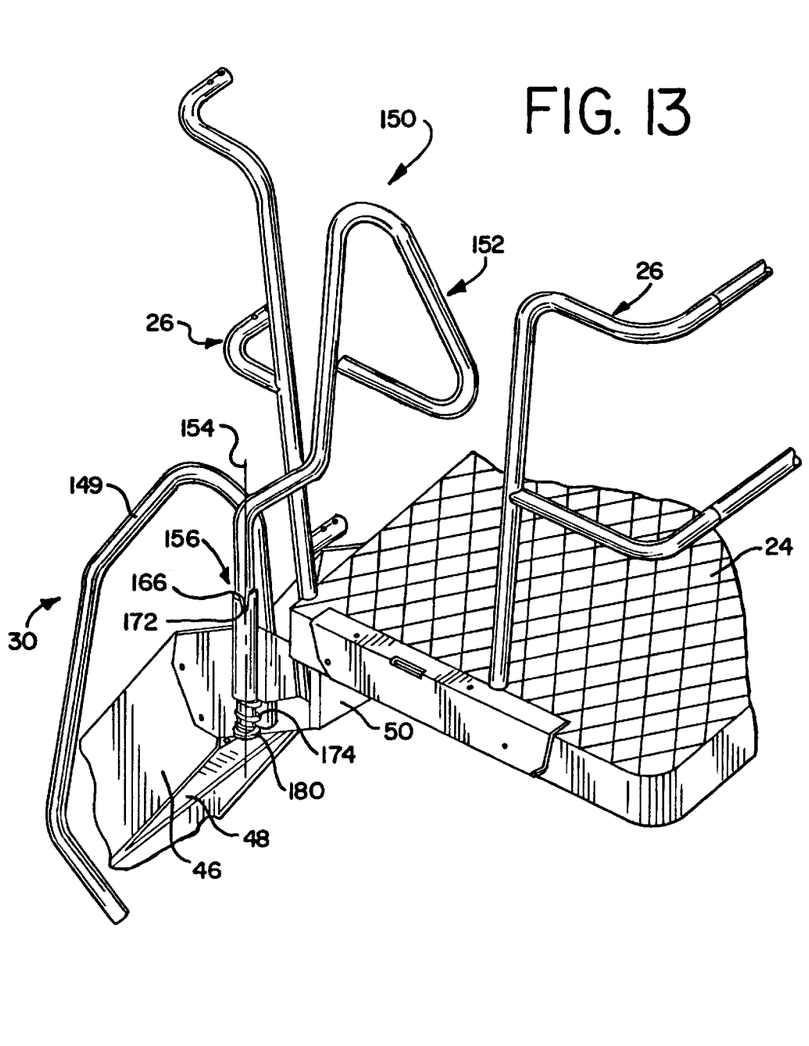
FIG. 13 is a perspective view of an upper end of the ladder assembly with the rail structure shifted to an alternative position relative to the ladder.

In effect, the rail structure 150 is mounted on the ladder 32 such that it is movable between the position shown in FIG. 9 and the position shown in FIG. 13 about axis 154. The rail structure 150 is manually shiftable relative to the ladder 32 such that when ladder 32 is pivoted into a storage position relative to the platform or deck 24, as shown in FIG. 13, the upper portion of the rail structure 150 is configured to extend at least partially across the access opening 28 in the guard rail 26 thereby hindering egress from the platform 24 through the access opening 28.

The ladder 32 of ladder assembly 30 normally extends vertically downward from the opening 28 in the guard rail 26 to readily provide ingress and egress to and from the elevated operator station 20. In this normal operating position, the steps 48 extend generally parallel to the platform or deck 24 and the ladder 32 is positioned on that side of the drive wheel 16 opposite from the operator station 20. In the embodiment of the invention schematically illustrated in FIG. 3, the lower and free end 46 of ladder 32 transversely projects outwardly from the frame 12 a greater distance than does the upper end 40 of ladder 32.

To raise the ladder 32 from its normal operating position, the operator merely actuates the single actuator 106 of the release mechanism 104 thereby allowing the ladder 32 to be manually pivoted about the generally horizontal axis 38 and, thus, elevationally raising the lower end of the ladder 32 to a transport position. As used herein, the term "transport position" of ladder 32 is meant to include substantially any position wherein the free end 46 of ladder 32 is moved to increase the clearance between the free end 46 of ladder 32 and the ground. Referring again to FIGS. 5 and 8, section 116 of actuator 106 is conveniently arranged relative to the operator station 20 to allow quick and easy release of the locking mechanism 76 holding ladder 32 in position.

To release the locking mechanism 76, the operator operates the release mechanism 104 by moving the actuator 106, preferably by pressing outwardly with a foot against section 116, to rock the pivot bar 108 in a counterclockwise direction about axis 112 thereby causing the locking pin 98 of detent mechanism 78 to release from the aperture or hole 94 in follower 92. Accordingly, the ladder 32 is free to be manually moved angularly about axis 38 to a transport position where the steps 48 on the ladder 32 are canted or angularly disposed relative to the platform or deck 24. The ladder 32 can be moved to any one of a selected number of positions that minimizes the likelihood of structure damage imparted to the ladder 32 either through ground contact, or impact against a stone or rock. Of course, raising the ladder 32 from its normal vertical position will likewise minimize damage to the crops as the machine is driven across the field. The plurality of angularly disposed holes 94 in the follower 92 permits the ladder 32 to assume any one of several different angular positions about the generally horizontal axis 38. Upon release of the actuator 106, the spring-biased pin 96 will automatically engage with the follower 82 to firmly lock the ladder 32 in position until released by the operator. Returning the ladder 32 to a normal vertical position is accomplished in the same manner.

When the ladder 32 is in a raised or generally horizontal position, the free end 46 of ladder 32 projects outwardly away from the frame 12. When the ladder 32 is in a raised generally horizontal position, and to minimize the adverse effect the raised free end 46 of the ladder 32 has on adjacent crop rows, the locking mechanism 76 is configured to releasably hold the ladder 32 in a transversely shifted position disposed inwardly of that position the free end of the ladder 32 normally would have been if the ladder 32 were to be rotated solely about axis 38 and into a generally horizontal position. As shown, the location of the hole or aperture 85 on the detent mechanism 78 is such that it allows the free end 46 of the ladder 32 to be transversely moved inwardly and releasably held relative to the frame 12 of the machine 10 by the locking pin 86.

With the ladder in a normal vertical disposition, it is not unusual for the ladder to engage an obstruction such as a fence post or gate as the machine is driven across the field. With the detent mechanism 76 firmly locking the ladder 32 in position, the engagement of the ladder 32 with an obstruction could result in damage to the ladder or to the machine. With the present invention, however, the shear assembly 140 allows the ladder 32 to deflect out of the effective line of travel of the obstruction thereby reducing or eliminating damage to the ladder 32 and the machine. As will be appreciated, when the obstructive force acting on the ladder is of a predetermined magnitude, the pin assembly 148 will shear thereby allowing the ladder 32 to pivot about axis 38 and relative to the follower 92 which remains firmly held in place by the detent mechanism.

Advantageously, the pivot mechanism 34 furthermore allows the ladder 32 to be moved from its normal operating position, whereat the ladder 32 vertically extends downwardly from the opening 28 in the guardrail 26, to a storage position whereat the ladder 32 is disposed in front of the drive wheel 16 with the steps 48 on the ladder 32 extending generally parallel to the platform 24. As will be appreciated, with ladder 32 disposed in a storage position, the width of the machine is minimized to facilitate transportation of the machine across the field.

To move the ladder 32 from its normal operational position to a storage position, the operator merely actuates the single actuator 106 of the release mechanism 104 thereby allowing ladder 32 to pivot about the generally horizontal axis 36 and, thus, shift to a position in front of the drive wheel 16. Referring again to FIG. 5, section 118 of the actuator 106 is conveniently arranged relative to the operator station 20 to allow quick and easy release of the locking mechanism 76 holding the ladder 32 in position.

To release the detent mechanism 78 holding the ladder 32 against movement from its normal operating position, the operator actuates the actuator 106, preferably by pressing downwardly with a foot against section 118, to rock the pivot bar 108 in a clockwise direction about axis 112 thereby causing the locking pin 86 of detent mechanism 78 to release from the aperture or hole 84 in follower 82. Accordingly, the ladder 32 along with pivot mechanism 34 manually moves freely about axis 36 to a storage position. The plurality of angularly disposed holes 84 permit the ladder 32 to assume any one of several different positions about axis 36. That is, the ladder 32 can be moved to any one of a selected number of angular positions about the axis 36 to reduce the width of the machine. Upon release of the actuator 106, the spring-biased pin 86 will automatically engage with the follower 82 to firmly lock the ladder 32 in place until released by the operator. Returning the ladder 32 from a storage position to its normal vertical position is accomplished in the same manner.

Turning now to FIG. 9, when the ladder 32 is in a normal vertical operating position relative to the platform or deck 24, the rail structure 150 is arranged within and relative to mount 156 such that the upper end or portion of the rail structure 150 does not provide any hindrance to ingress and egress through the access opening 28 in the guardrail 26. When the ladder 32 is moved to a storage position, as shown in FIG. 13, however, it is desirable to provide a hindrance against a person passing through the access opening 28 in the guardrail 26 since the ladder 32 is no longer positioned to allow the operator to climb down from the platform 24.

As mentioned above, the rail member 152 is mounted in the mount 156 to allow the rail structure 150 to be shifted about axis 154 as required. That is, after the ladder 32 is located in the storage position in front of wheel 16, the operator merely needs to lift the rail structure 150 and rotate it about axis 154 so that the rail structure 150 which moves with the ladder 32 extends across the opening 28 of the guardrail 26 thereby inhibiting passage through the opening 28. When the rail structure 150 is vertically lifted relative to mount 156, the stop 180 limits the upward vertical travel of the rail member 150 within the mount 156. Also, the contoured top edge 162 of the mount 156 limits the arcuate travel of the rail member 150 within the mount 156. In moving the rail structure 150, the cross pin 172 is removed from one pair of notches 166 and repositioned in the other pair of notches 168 thereby securing the rail structure 150 in place. The spring 174 acting on rail member 152 adds to the gravitational weight of the rail structure 150 and promotes positive locking of the cross pin 172 into either pair of notches 166, or 168. Before the ladder 32 is returned to its operational position relative to the deck 24, the rail structure 150 may be angularly shifted relative to the ladder 32 in a reverse order from that described above.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An access ladder assembly for an off-highway machine having a fore-and-aft extending frame supporting an elevated operator station, said ladder assembly comprising:

an elongated ladder affording access to said elevated operator station from the ground, said ladder having an upper end disposed proximate to the elevated operator station and a lower end; and a mechanism connecting said ladder to the frame for selective movement about a first axis allowing the lower end of the ladder to pivot upwardly from a generally vertical position to a generally horizontal position to enhance the ground clearance between the lower end of the ladder and the ground over which the machine moves and about a second axis allowing the ladder to be shifted between a first position, whereat the ladder is arranged to one side of the machine, and a second position, whereat the ladder is arranged to a front of the machine.

2. The access ladder assembly according to claim 1 wherein said mechanism includes a pivot member rotatably mounted on said frame and defines said first and second axes.

3. The access ladder assembly according to claim 1 further including a locking mechanism to releasably hold said ladder in an adjusted angular disposition relative to said operator station about said first and second axes.

4. The access ladder assembly according to claim 3 wherein said locking mechanism includes a release mechanism conveniently located relative to the operator station to release the locking mechanism and allow the angular disposition of the ladder relative to the operator station to be adjusted about said first and said second axes.

5. The access ladder assembly according to claim 1 wherein said mechanism further includes a shear pin to hold said ladder in place about said first axis but allow said ladder to pivot about said first axis when a force of sufficient magnitude is applied to the ladder to shear said pin.

6. The access ladder assembly according to claim 1 further including a rail structure projecting upwardly from the upper end of the ladder, said rail structure being mounted for movement relative to said ladder between a first position and a second position such that when said rail structure is in said first position said rail structure permits ingress to and egress from the operator station, and such that when said rail structure is in said second position at least a portion of the rail structure hinders ingress to and egress from the operator station.

7. An access ladder assembly for an agricultural machine having a main body supported on ground engaging wheels projecting laterally along said body, and an elevated operator station, said ladder assembly comprising:

an elongated ladder affording access to said elevated operator station from the ground, said ladder having an upper end connected to the machine proximate to the elevated operator station and a free lower end; and a mechanism connecting said ladder to the machine for selective pivotable movement about a generally horizontal axis between a normal vertical position and a raised transport position, said mechanism further connecting said ladder to the machine for selective shifting movement about a generally vertical axis between an operative position in which the ladder extends downwardly from the operator station on an opposite side of the wheel from the operator station and a storage position in which the ladder extends downwardly from the operator station and is disposed generally transverse to the wheel.

8. The access ladder assembly according to claim 7 wherein said mechanism includes an angled one-piece pivot member rotatably mounted on said machine, said pivot member including interconnected arms extending generally normal to each other to define said horizontal and vertical axes about which said ladder moves.

9. The access ladder assembly according to claim 7 further including a locking mechanism to selectively lock said ladder in its operative and storage positions.

10. The access ladder assembly according to claim 7 further including a locking mechanism to selectively maintain said ladder in a plurality of positions between said vertical and raised positions.

11. The access ladder assembly according to claim 10 wherein the upper end of said ladder is disposed transversely closer to said body than is the free lower end of said ladder, and wherein said locking mechanism is configured to allow the free lower end of said ladder to be transversely shifted and releasably held in a position proximate to said body after the ladder is moved about said horizontal axis.

12. The access ladder assembly according to claim 7 further including a resiliently biased locking mechanism to selectively lock said ladder in an adjusted position angularly disposed about either said horizontal and vertical axes about which said ladder moves.

13. The access ladder assembly according to claim 12 wherein said locking mechanism further includes a release mechanism conveniently located relative to the operator station to release the resiliently biased locking mechanism and allow the ladder to assume an angularly adjustable position disposed about either the horizontal and vertical axes about which the ladder moves.

14. The access ladder assembly according to claim 7 further including a rail structure projecting upwardly from the upper end of the ladder, said rail structure being mounted for movement relative to said ladder between a first position and a second position such that when said rail structure is in said first position said rail structure permits ingress to and egress from the operator station, and such that when said rail structure is in said second position at least a portion of the rail structure hinders ingress to and egress from the operator station.

15. An access ladder assembly for an off-highway machine having a frame with an elevated operator station, said ladder assembly comprising:

a ladder providing access to the operator station, said ladder being connected to the frame by a singular pivot mechanism having a generally horizontal axis intersecting a generally vertical axis that allows pivotal movement of the ladder about both the generally horizontal axis and the generally vertical axis.

16. The access ladder assembly according to claim 15 further including structure to releasably lock said ladder in different positions disposed about the horizontal and vertical axes.

17. The access ladder assembly according to claim 16 wherein said locking structure comprises a first movable pin radially disposed from and generally parallel to said horizontal axis about which said ladder pivots and a first shiftable follower that turns in response to movement of the ladder and combines with said first pin to lock said ladder in different angular dispositions about said horizontal axis, and a second movable pin disposed from and generally parallel to said vertical axis about which said ladder turns and a second shiftable follower that turns with the ladder and combines with said second pin in locking said ladder against turning movements relative to said vertical axis.

18. The access ladder assembly according to claim 17 further including a release mechanism conveniently located relative to the operator station to selectively operate said locking structure and allow the ladder to assume different angular positions about the horizontal and vertical axes about which the ladder moves.

19. The access ladder assembly according to claim 18 wherein said release mechanism includes a foot pedal.

20. The access ladder assembly according to claim 16 wherein said locking structure includes a shear pin to hold against unintentional pivotal movement about said horizontal axis relative to said operator station while allowing said ladder to pivot about said horizontal axis when a force of sufficient magnitude is applied to the ladder to shear said pin.

21. The access ladder assembly according to claim 15 further including a rail structure projecting upwardly from an upper end of the ladder, said rail structure being mounted for pivotal movement relative to said ladder between a first position and a second position such that when said rail structure is in said first position said rail structure permits ingress to and egress from the operator station, and such that when said rail structure is in said second position at least a portion of the rail structure hinders ingress to and egress from the operator station.

* * * * *